United States Patent [19]

Falck et al.

[11] 4,285,271
[45] Aug. 25, 1981

[54] SEAL PLATE DRIVE FOR USE WITH APPARATUS FOR PRESSURE FEEDING AND PRESSURE COOKING A FOOD PRODUCT

[75] Inventors: Glenn H. Falck; James R. Boose, both of Montgomery, Pa.

[73] Assignee: Koppers Company, Inc., Pittsburgh, Pa.

[21] Appl. No.: 140,125

[22] Filed: Apr. 14, 1980

[51] Int. Cl.$^3$ ............................................. A47J 27/12
[52] U.S. Cl. ...................................... 99/348; 99/353; 99/355; 100/148
[58] Field of Search .............. 99/348, 353, 355, 323.4; 100/147, 148, 149; 192/67 R, 85 C, 85 CA; 277/205, 152

[56] References Cited

U.S. PATENT DOCUMENTS

| | | | |
|---|---|---|---|
| 3,054,343 | 9/1962 | Pellett | 100/148 |
| 3,246,594 | 4/1966 | Fisher | 99/353 |
| 3,400,654 | 9/1968 | Vincent | 100/148 |
| 3,766,848 | 10/1973 | French | 100/149 |

*Primary Examiner*—Robert W. Jenkins
*Attorney, Agent, or Firm*—Thomas F. Shanahan; H. J. Zeh, Jr.; O. B. Brumback

[57] ABSTRACT

A seal plate drive assembly for use with apparatus for pressure cooking a farinaceous product is disclosed, in which said apparatus includes a pressure feeder assembly, a seal plate and seal plate drive assembly for compacting and regulating the flow of product mix in a terminal portion of the pressure feeder assembly and a pressure cooker assembly. The seal plate drive assembly is comprised of a rotatable and axially translatable seal plate shaft that enters into a feeder housing providing communication between the pressure feeder assembly and the pressure cooker assembly and supports the seal plate therein, a circumscribing tubular drive shaft telescopically receiving the seal plate drive shaft and arranged to be mounted externally of the feeder housing, bearings to support the tubular drive shaft, a coupling interconnecting the two shafts to permit co-rotation while allowing axial translation of the seal plate shaft, means to drive the tubular drive shaft in rotation and means to impart axial translation to the seal plate shaft. Also included are a first seal means disposed between the seal plate shaft and the tubular drive shaft at a location adjacent the feeder housing to prevent ingress of product mix and superatmospheric steam between the shafts and a second seal means cooperatively associated with the feeder housing and the tubular drive shaft to prevent egress of product mix and superatmospheric steam from the feeder housing and along the outer periphery of the tubular drive shaft.

20 Claims, 4 Drawing Figures

SEAL PLATE DRIVE FOR USE WITH APPARATUS FOR PRESSURE FEEDING AND PRESSURE COOKING A FOOD PRODUCT

BACKGROUND OF THE INVENTION

1. Field of the Invention

This invention relates to a seal plate drive assembly and, more specifically, to a seal plate drive assembly for use with apparatus for pressure cooking a farinaceous product. In particular, the present invention relates to a seal plate drive assembly for use with apparatus for pressure feeding and pressure cooking a food product and, in which, the apparatus includes a pressure feeder assembly, a seal plate and seal plate drive assembly for compacting and regulating the flow of product mix in a terminal portion of the pressure feeder assembly and a pressure cooker assembly. Additionally, the apparatus for which the invention is primarily intended also includes an extruder assembly for extruding the pressure cooked food product and a cut-off assembly for pelletizing the extruded product.

2. Description of the Prior Art

The present invention is an improvement over applicant's assignee's cooker/extruder apparatus which is fully disclosed in U.S. Pat. No. 3,246,594 to C. D. Fisher, the disclosure of which is intended to be incorporated herein by reference.

Briefly, disclosed in the aforesaid U.S. Pat. No. 3,246,594 is an apparatus for continuously pressure cooking various cereal materials, under superatmospheric steam conditions, to produce a cooked, extrudable mash and, then, extruding the cooked mash through a plurality of die orifices. An important requisite for the successful operation of this apparatus is the ability to form a pressure resistant seal at the inlet to the pressure cooker. In accordance with the patent, this seal is created by compacting the dry incoming material or particulate product mix into a pressure resistant plug in the outlet or terminal end of its pressure feeder mechanism. Further, in accordance with the patent, after the seal has been formed, it is generally then desirable or necessary to abrade the compacted material back to its original particulate state to assure uniform and thorough penetration of the superatmospheric steam in the pressure cooker. A suitable mechanism and procedure for accomplishing the seal/abrasion function is fully disclosed in the patent.

More specifically, in accordance with the above-mentioned patent, dry incoming material is advanced from a materials inlet or hopper to the pressure cooker inlet by a pressure feeder mechanism consisting of a screw conveyor. As the material advances from the inlet of the screw conveyor to its discharge or terminal end, partial compaction of the material occurs as a result of a decrease in the flight channel depth of the feeder screw, created by increasing the root diameter of the screw. Further compaction occurs as the material advances against a rotatable and axially translatable seal plate or gate disposed in confronting relation to the outlet end of the screw conveyor. The seal plate or gate is mounted on a shaft extending through or into a feeder housing connecting the screw conveyor discharge to the pressure cooker inlet. The force with which the seal plate is held against the advancing material, as well as its axial movement, is controlled by a fluid actuated, piston-cylinder assembly connected to the distal end of the seal plate shaft. The abrasion function is accomplished by rotating the seal plate shaft and, accordingly, the seal plate and associated abrading lugs through a jack-shaft/gear drive arrangement. During normal operation, simultaneous axial movement and rotation of the seal plate shaft will continuously take place. Since the apparatus is operating against superatmospheric steam pressure, it is necessary to provide a shaft seal. The shaft seal disclosed in the patent is a packing gland arrangement.

While the above-described assembly functions satisfactorily, it does have certain drawbacks. First, the packing gland, by design, must have a slight clearance between the rotating shaft and the packing. Consequently, there will be leakage of superatmospheric steam, as well as the materials being processed. If the clearance is too great, leakage will be excessive and will create a massive buildup of raw materials in the housing surrounding the seal plate drive assembly. If there is no clearance, the packing will run dry creating frictional heat and causing degradation of the packing gland. Running dry can also cause the shaft to be scored and excessive leakage to begin. Additionally, because of the axial movement of the shaft, process materials, some of which are highly abrasive, can be drawn along with the shaft into the packing gland. Proper maintenance and adjustment of the packing glands depends upon the skill, judgment and attention of the operator. Second, support of the drive shaft is difficult. The drive shaft bearings must permit both axial and rotational movement. The bearings and/or bushings disclosed in the patent are generally satisfactory but their life is limited. Finally, because of the axial movement of the shaft, the drive gears must slide on each other. As the gears wear, problems can be experienced with smooth, uniform axial movement. It is the correction or elimination of the foregoing limitations or deficiencies of the prior art to which the present invention is directed.

SUMMARY OF THE INVENTION

In accordance with the present invention, the above enumerated and other deficiencies of the known prior art structure are overcome by providing a seal plate drive assembly comprised of a rotatable and axially translatable seal plate shaft that supports the seal plate in the feeder housing or feeder discharge housing and is telescopically received by a tubular drive shaft mounted in a pair of anti-friction bearings externally of the feeder housing and, wherein, a spline coupling preferably interconnects the two shafts to permit co-rotation while allowing axial translation of the seal plate shaft. Drive means are provided to drive the tubular drive shaft in rotation and to impart axial translation to the seal plate shaft. Also, a first seal means is disposed between the seal plate shaft and the tubular drive shaft at a location adjacent the feeder housing to prevent ingress of product mix and superatmospheric steam between the shafts and a second seal means is cooperatively associated with the feeder housing and the tubular drive shaft to prevent egress of product mix and superatmospheric steam from the feeder housing and along the outer periphery of the tubular drive shaft.

One distinguishing feature of the improved apparatus of this invention resides in the separation of the axial and rotational motions. By doing so, separate seals that are specifically designed to accommodate each of the respective motions can be employed. Additionally, the two anti-friction bearings that are preferably employed provide superior support and their life is manyfold greater than the bearing arrangement of the disclosed prior art structure. Also, with the improved arrangement of this invention, sliding gears and their attendant wear problems are eliminated. Moreover, the axial and rotational motion is preferably transmitted through a spline interconnection of the tubular drive shaft and the seal plate shaft. With this arrangement there is no relative rotary motion between the two shafts. The loading and subsequent wear on the spline teeth is much less than with the sliding gear arrangement of the patent because it is distributed over a greater area. In addition, there are no separating forces generated as is typical with a meshing drive gear set. In general, the improved drive assembly of this invention provides longer, trouble free operation for the customer.

The foregoing and other objects, features and advantages of this invention will become more apparent with further consideration of the disclosure thereof and, in particular, when viewed in conjunction with the following specification, the accompanying drawings and the appended claims.

DESCRIPTION OF THE PREFERRED EMBODIMENT

Figure 1:
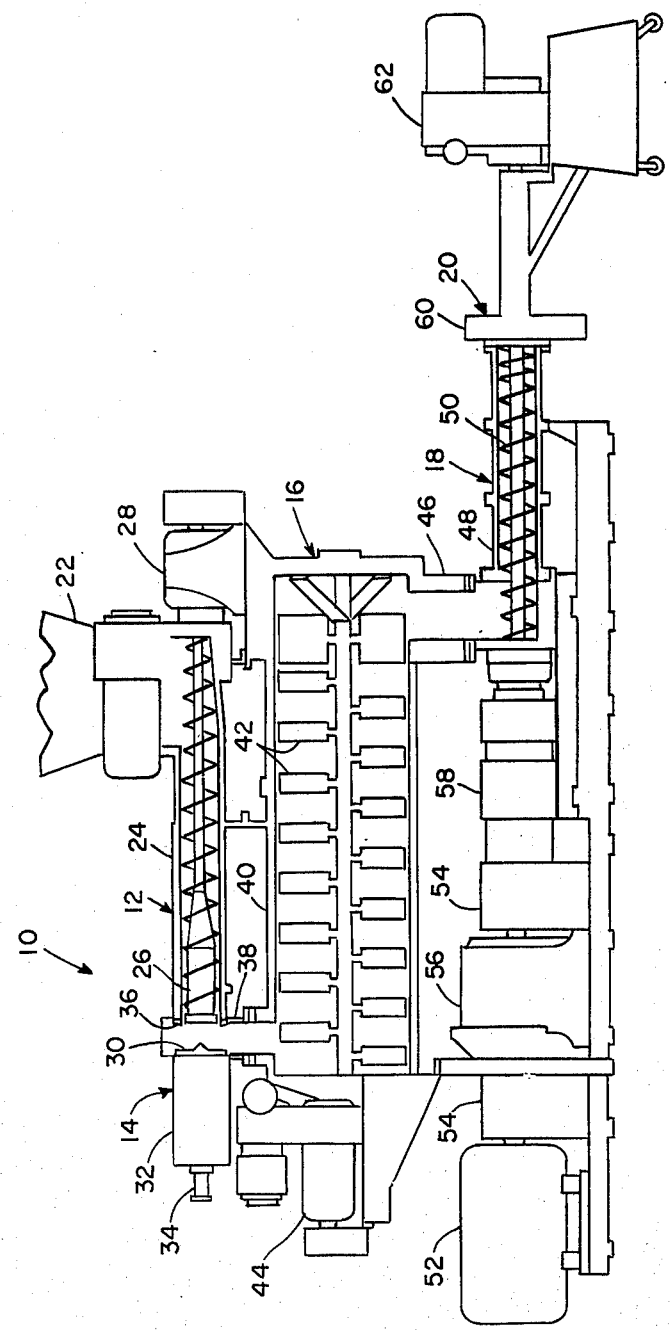
FIG. 1 is a generally schematic illustration of a cooker/extruder processing arrangement for which the present invention is specifically adapted.

Referring to FIG. 1, there is shown schematically a typical cooker/extruder apparatus 10 to which the present invention specifically relates. As therein illustrated, the apparatus 10 generally comprises a pressure feeder assembly 12, a seal plate and seal plate drive assembly 14, a pressure cooker assemby 16, an extruder assembly 18 and a cut-off assembly 20. As shown, pressure feeder assembly 12 includes a feed inlet 22 into a horizontal, cylindrical, pressure feed barrel 24 containing a pressure feed screw or conveyor 26 provided with a suitable drive means 28. Mounted in opposed or confronting relation to pressure feed screw 26 and barrel 24 is a pressure seal plate 30, actuated by seal plate drive assembly portion 32 and a double-acting, piston-cylinder assembly 34, the details of which will be explained more fully hereinafter. Also indicated is a seal ring 36, between the seal plate 30 and pressure feed barrel 24.

A feeder housing or feeder discharge housing 38 is shown providing communication between a terminal portion of the pressure feeder assembly 12 and the pressure cooker assembly 16. Pressure cooker assembly 16 essentially comprises an elongated vessel 40 containing rotary mixing paddles 42, suitably journaled therein and provided with a drive means 44. Also, as is fully explained in the aforesaid patent, pressure cooker vessel 40 is suitably provided with means (not shown) for introducing therein superatmospheric steam and/or water or other liquids.

At the discharge end of cooker vessel 40 is shown an extruder inlet 46 to extruder assembly 18. Extruder assembly 18 is comprised of an extruder barrel 48, an extruder screw 50, screw drive means 52, couplings 54, a gear reducer 56, a bearing assembly 58 and, at the discharge end of the extruder barrel, an extruder die (not shown). Finally, there is shown a cut-off assembly 60, of conventional construction, for producing pellets of the extruded food product and a cut-off drive 62, also of known construction.

Figure 2:
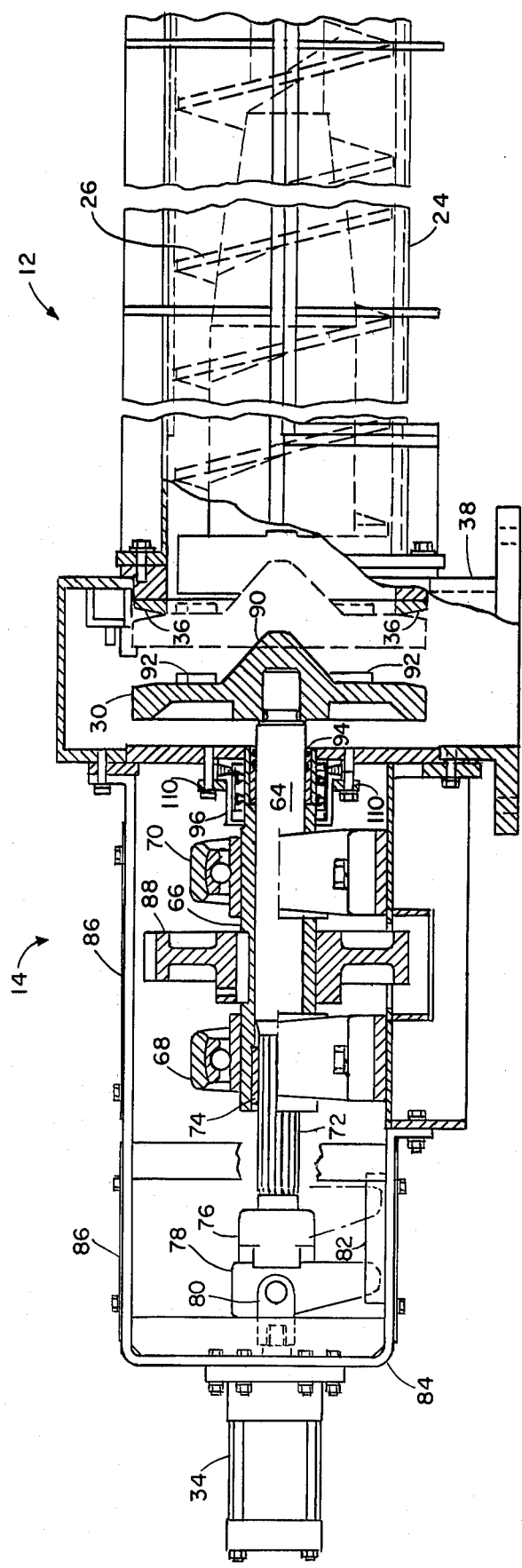
FIG. 2 is a side elevation of the seal plate and seal plate drive assembly of this invention and terminal portions of its associated pressure feeder assembly, partly in section and partly broken away and with some cross-hatching omitted for the sake of ease of understanding.

Referring, now, more particularly to FIG. 2, there is shown the preferred seal plate and seal plate drive assembly 14 of this invention, and portions of its associated pressure feeder assembly 12. As aforesaid, product mix to be pressure cooked is fed by any suitable means into pressure feeder assembly 12. As the material or materials advance from the inlet of the pressure feeder assembly 12 to its discharge or terminal end, partial compaction of the material occurs as a result of a decrease in the flight channel depth of the feeder screw 26, or, an increase in the root diameter of the feeder screw 26, from its inlet to its discharge end. Further compaction occurs as the material advances against a rotatable and axially translatable gate or seal plate 30 disposed in confronting relation to the outlet end of the pressure feed screw 26. The seal plate or gate 30 is mounted on a rotatable and axially translatable seal plate shaft 64 extending through or into feeder housing or feeder discharge housing 38 connecting the screw conveyor discharge or pressure feeder assembly 12 to the inlet of the pressure cooker assembly 16. The force with which the seal plate 30 is held against the advancing material for compaction, as well as its axial movement, is controlled by a fluid actuated, preferably pneumatic, piston-cylinder assembly 34 connected to the distal end of seal plate shaft 64. Seal plate 30 may assume any of a plurality of desired positions, some of which are shown.

Seal plate shaft 64 is supported for its axial and rotational movements by being telescopically received in the circumscribing tubular drive shaft 66 which, as shown, is rotatably mounted in a pair of spaced-apart anti-friction bearings 68 and 70. A spline interconnection between shafts 64 and 66 is preferably provided and consists of an elongated male spline portion 72, formed on seal plate shaft 64, intermeshing with a female spline portion or spline hub 74, fitted within the end of tubular drive shaft 66 that is nearest to piston-cylinder assembly 34. Seal plate shaft 64 is thence connected at its distal end to piston-cylinder assembly 34 by means of a rotary bearing assembly 76, an adaptor 78 and a clevis or yoke 80 affixed to the piston rod of piston-cylinder assembly 34. For reasons that will be apparent hereinafter, adaptor 78 is prevented from rotating but permitted to reciprocate by having a portion thereof, as shown, received in an axially extending slotted member 82 affixed to a generally U-shaped drive and piston cylinder support 84 bolted or otherwise affixed to feeder housing 38. The sides of support 84 are suitably provided with cover members 86 to provide a completely enclosed drive housing.

As shown, affixed to the outer periphery of tubular drive shaft 66 at a location intermediate the anti-friction bearings 68 and 70 is a spur gear 88. Spur gear 88 may be driven in rotation by any conventional means (not shown), such as the jackshaft/gear arrangement of the prior art patent or its own separate drive motor. Additionally, it is within the skill of the art to provide for rotation of gear 88 in either direction, as desired, although, generally, counter-rotation with respect to the direction of rotation of pressure feed screw 26 is preferred. As will be understood, rotation of gear 88 rotates tubular drive shaft 66 with respect to anti-friction bearings 68 and 70 and, through the spline coupling parts 72 and 74, co-rotates seal plate shaft 64 and seal plate 30. Simultaneously, actuation of piston-cylinder assembly 34 will provide axial translation of seal plate shaft 64 with respect to tubular drive shaft 66.

Seal plate 30 is a generally cylindrical or disc-shaped member having a centrally located conical nose portion 90 and a plurality of attrition lugs or projections 92, only some of which are shown. It should also be noted that, for sealing engagement of seal plate 30 with pressure feed barrel 24, there is provided at the end of pressure feed barrel 24 a fixed, annular, seal ring 36. Seal plate 30 in its advanced or rightward position, as viewed, interacts at a perimeter portion with seal ring 36 to seal off superatmospheric steam from entering into pressure feed barrel 24.

Turning now to the shaft seals, there is employed a rod seal or wiper/scraper shaft seal 94 disposed between the seal plate shaft 64 and the tubular drive shaft 66, at a location adjacent the feeder housing 38, to prevent ingress of product mix and superatmospheric steam between the two shafts. Also provided is a mechanical shaft seal or rotary shaft seal 96 cooperatively associated with the feeder housing 38 and the tubular drive shaft 66 to prevent egress of product mix and superatmospheric steam from the feeder housing 38 and along the outer periphery of the tubular drive shaft 66.

Figure 3:
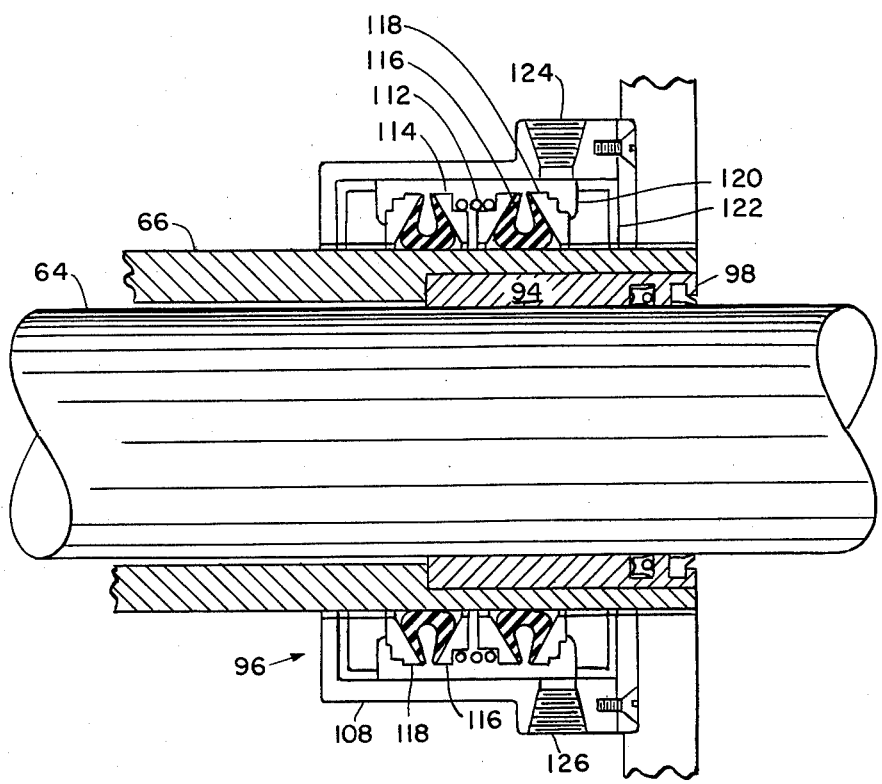
FIG. 3 is an enlargement of the shaft seal assemblies shown in FIG. 2, partly in section.
Figure 4:
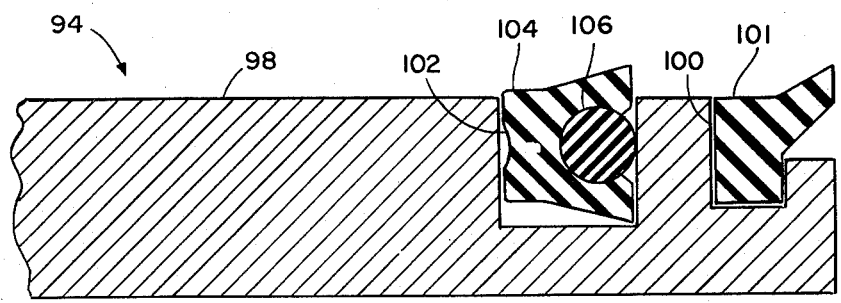
FIG. 4 is a further enlargement, in section, of a portion of the shaft seal arrangement for the seal plate drive shaft.

As best shown in FIGS. 3 and 4, wiper/scraper shaft seal 94 includes a cylindrical shaft seal retainer member 98 fixedly attached, as by a shrink fit, within a corresponding cylindrical cut-away portion of the interior surface of tubular drive shaft 66 at its end portion adjacent feeder housing 38. At least a pair of annular, generally rectangular, seal supporting grooves 100 and 102 are provided on the inward facing surface of retainer member 98. Disposed within the grooves 100, nearest seal plate 30, is a commercially available wiper/scraper seal ring 101 produced by Parker Hannifin Corp., 10567 Jefferson Boulevard, Culver City, Calif., and identified as a Series 959-21 wiper ring. Disposed within the groove 102, furthest displaced with respect to seal plate 30, is a Parker wiper/scraper seal ring 104 sold commercially under Part No. 18702000. The latter seal combines an O-ring type synthetic rubber O-spring 106 that loads its sealing lips and prevents seal distortion under vacuum or extreme pressure. Both seals are characterized by having a lip portion extending at an acute angle in a direction toward the seal plate 30 and in continuous circumferential contact with the seal plate shaft 64 and both are preferably composed of ethylene propylene polymer.

Also illustrated in greater detail in FIG. 3 is rotary shaft seal 96, which is a commercially available mechanical or dynamic shaft seal designed to eliminate the leakage of gases and liquids around rotating shafts. The particular seal shown is identified as an RP92 seal and is manufactured by Syntron Division, FMC Corporation, of Homer City, Pa. Seal 96 has all of its working parts enclosed within a metal casing 108 which is suitably secured to feeder housing 38 (FIG. 2), as by means of an annular clamping ring 110 bolted to the seal plate drive side of feeder housing 38. As shown, the seal casing 108 surrounds tubular drive shaft 66. Its rotating parts include tension spring 112, spring tension rings 114, driving rings 116 and seal face rings 118. Its stationary parts include anti-friction sealing rings 120, anti-friction ring seats 122 and, of course, seal casing 108. The rotating seal parts are held to the tubular drive shaft 66 by the flexible driving rings 116 which rotate with the tubular drive shaft 66, thereby rotating these seal parts and effecting a positive seal between the lapped seal face rings 118 and the stationary, self-lubricating, microfine graphite seal rings 120. In the practice of this invention it is preferred that the driving rings 116 and anti-friction ring seats 122 be of Buna-N and that the seal face rings 118 be of bronze.

The seal 96 must be filled with an abrasive free and chemically non-destructive liquid, such as water, to act as a heat conductor or absorber and carry off the small amount of frictional heat generated. For this purpose, casing 108 is provided with a pair of outlet or inlet parts 124 and 126 that may, in any suitable manner, be connected to cooling liquid conduits (not shown) for flush cooling. The flush cooling principle, besides maintaining seal temperature within the safe operating range, also serves another equally important function. It pressurizes the seal. The independent flushing liquid supply must be at a pressure slightly above the pressure of the fluid, i.e., superatmospheric steam, being sealed. The shaft seal 96 is not spring loaded to a maximum working pressure; it must be work loaded by the pressure of the sealing liquid within the seal cavity.

According to the provisions of the patent statutes, the foregoing explains the principle, preferred construction and mode of operation of the invention and there has been illustrated and described what is now considered to represent its best embodiment. However, it should be understood that, within the scope of the appended claims, the invention may be practiced otherwise than as specifically illustrated and described.

What is claimed is:

1. Apparatus for continuously pressure cooking, extruding and forming pellets of a food product, which apparatus includes a pressure feeder assembly, a seal plate assembly, a pressure cooker assembly, an extruder assembly and a cut-off assembly and, in which, said seal plate assembly comprises:
   (a) a seal plate for compacting and regulating the flow of product mix in a terminal portion of said pressure feeder assembly so as to form a pressure seal for the pressure cooker assembly,
   (b) said seal plate carrying means thereon for abrading the compacted product mix for quick, uniform heating in said pressure cooker assembly,
   said seal plate being mounted on one end of a rotatable and axially translatable seal plate shaft that enters into a feeder housing providing communication for said product mix from said terminal portion of said pressure feeder assembly to the inlet of said pressure cooker assembly,
   (d) said seal plate shaft being telescopically received within a tubular drive shaft mounted externally of said feeder housing,
   (e) bearing means supporting said tubular drive shaft for rotation,
   (f) coupling means interconnecting said tubular drive shaft to said seal plate shaft so that both shafts will co-rotate while permitting axial translation of said seal plate shaft with respect to said tubular drive shaft,
   (g) first drive means operatively connected to said tubular drive shaft to impart rotary motion thereto, (h) second drive means operatively connected to said seal plate shaft to impart translatory motion thereto, (i) first seal means disposed between said seal plate shaft and said tubular drive shaft at a location adjacent said feeder housing to prevent ingress of product mix and superatmospheric steam between said shafts, and (j) second seal means cooperatively associated with said feeder housing and said tubular drive shaft to prevent egress of product mix and superatmospheric steam from said feeder housing and along the outer periphery of said tubular drive shaft.

2. Apparatus as in claim 1 wherein said coupling means comprises a spline connection between said tubular drive shaft and said seal plate shaft at corresponding end portions of said shafts opposite the location of said first and second seal means.

3. Apparatus as in claim 2 wherein said bearing means comprises at least a pair of anti-friction bearings respectively supporting said tubular drive shaft on opposite sides of said first drive means.

4. Apparatus as in claim 3 wherein said first seal means comprises a seal ring retainer means on said tubular drive shaft, a plurality of continuous seal rings mounted in said retainer means, each of said seal rings having a lip portion extending at an acute angle in a direction toward said seal plate and in continuous circumferential contact with said seal plate shaft, and at least one of said seal rings having its lip portion spring biased toward said seal plate shaft to provide positive lip pressure.

5. Apparatus as in claim 4 wherein said second seal means comprises a seal casing surrounding said tubular drive shaft, means to secure said seal casing to said feeder housing, spring biased flexible driving rings and seal face rings within said casing constructed and arranged to rotate with said tubular drive shaft, stationary anti-friction sealing rings in the ends of said casing arranged to cooperate with said rotatably arranged seal face rings to provide a positive seal, and means to fluid pressurize the interior of said casing to provide desired work loading of said sealing rings and said seal face rings and to maintain the seal temperature at a desired level.

6. Apparatus as in claim 5 wherein said first drive means includes a spur gear secured to said tubular drive shaft intermediate said anti-friction bearings.

7. Apparatus as in claim 6 wherein said pressure feeder assembly includes a pressure feed screw and means for driving said pressure feed screw in rotation and said first drive means further includes means to drive said spur gear in counter-rotation with respect to said pressure feed screw.

8. Apparatus as in claim 6 wherein said pressure feeder assembly includes a pressure feed screw and means for driving said pressure feed screw in rotation and said first drive means further includes means to drive said spur gear in co-rotation with respect with said pressure feed screw.

9. Apparatus as in claim 5 wherein said second drive means comprises a double-acting, pneumatic, piston-cylinder drive having its piston rod operatively connected to the splined end of said seal plate shaft through a rotary bearing member to permit rotary movement of said seal plate shaft independently of the axial translation thereof.

10. Apparatus as in claim 5 which further includes a seal plate drive housing and support means attached to said feeder housing and enclosing said tubular drive shaft, bearing means, coupling means, first drive means and said first and second seal means.

11. A seal plate drive assembly for use with apparatus for pressure cooking a food product, which apparatus includes a pressure feeder assembly, a seal plate for compacting and regulating the flow of product mix in a terminal portion of said pressure feeder assembly and a pressure cooker assembly, said seal plate drive assembly comprising:

(a) a rotatable and axially translatable seal plate shaft constructed and arranged to enter into a feeder housing and to support said seal plate therein, said feeder housing providing communication for said product mix from said terminal portion of said pressure feeder assembly to the inlet of said pressure cooker assembly, (b) said seal plate shaft being telescopically received within a tubular drive shaft constructed and arranged to be mounted externally of said feeder housing, (c) bearing means supporting said tubular drive shaft for rotation, (d) coupling means interconnecting said tubular drive shaft to said seal plate shaft so that both shafts will co-rotate while permitting axial translation of said seal plate shaft with respect to said tubular drive shaft, (e) first drive means operatively connected to said tubular drive shaft to impart rotary motion thereto, (f) second drive means operatively connected to said seal plate shaft to impart translatory motion thereto, (g) first seal means disposed between said seal plate shaft and said tubular drive shaft at a location adjacent said feeder housing to prevent ingress of product mix and superatmospheric steam between said shafts, and (h) second seal means co-operatively associated with said feeder housing and said tubular drive shaft to prevent egress of product mix and superatmospheric steam from said feeder housing and along the other periphery of said tubular drive shaft.

12. Apparatus as in claim 11 wherein said coupling means comprises a spline connection between said tubular drive shaft and said seal plate shaft at corresponding end portions of said shafts opposite the location of said first and second seal means.

13. Apparatus as in claim 12 wherein said bearing means comprises at least a pair of anti-friction bearings respectively supporting said tubular drive shaft on opposite sides of said first drive means.

14. Apparatus as in claim 13 wherein said first seal means comprises a seal ring retainer means on said tubular drive shaft, a plurality of continuous seal rings mounted in said retainer means, each of said seal rings having a lip portion extending at an acute angle in a direction toward said seal plate and in continuous circumferential contact with said seal plate shaft, and at least one of said seal rings having its lip portion spring biased toward said seal plate shaft to provide positive lip pressure.

15. Apparatus as in claim 14 wherein said second seal means comprises a seal casing surrounding said tubular drive shaft, means to secure said seal casing to said feeder housing, spring biased flexible driving rings and seal face rings within said casing constructed and arranged to rotate with said tubular drive shaft, stationary anti-friction sealing rings in the ends of said casing arranged to cooperate with said rotatably arranged seal face rings to provide a positive seal, and means to fluid pressurized the interior of said casing to provide desired work loading of said sealing rings and said seal face rings and to maintain the seal temperature at a desired level.

16. Apparatus as in claim 15 wherein said first drive means comprises a spur gear secured to said tubular drive shaft intermediate said anti-friction bearings.

17. Apparatus as in claim 16 wherein said pressure feeder assembly includes a pressure feed screw and means for driving said pressure feed screw in rotation and said first drive means further includes means to drive said spur gear in counter-rotation with respect to said pressure feed screw.

18. Apparatus as in claim 16 wherein said pressure feeder assembly includes a pressure feed screw and means for driving said pressure feed screw in rotation and said first drive means further includes means to drive said spur gear in co-rotation with respect to said pressure feed screw.

19. Apparatus as in claim 15 wherein said second drive means comprises a double-acting, pneumatic, piston-cylinder drive having its piston rod operatively connected to the splined end of said seal plate shaft through a rotary bearing member to permit rotary movement of said seal plate shaft independently of the axial translation thereof.

20. Apparatus as in claim 15 which further includes seal-plate-drive housing and support means attached to said feeder housing and enclosing said tubular drive shaft, bearing means, coupling means, first drive means and said first and second seal means.

* * * * *